(12) United States Patent
Tao

(10) Patent No.: US 11,172,075 B2
(45) Date of Patent: Nov. 9, 2021

(54) DEVICE MANAGEMENT SYSTEM, APPARATUS, AND DEVICE INVOLVING REQUEST TO CHANGE TO A HIGHER FAILURE RISK CONDITION THAT CHANGES THE TARGET DEVICE MONITORING CONDITION

(71) Applicant: Satoru Tao, Kanagawa (JP)

(72) Inventor: Satoru Tao, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/086,495

(22) Filed: Nov. 2, 2020

(65) Prior Publication Data

US 2021/0160380 A1 May 27, 2021

(30) Foreign Application Priority Data

Nov. 27, 2019 (JP) .............................. JP2019-214516
Sep. 25, 2020 (JP) .............................. JP2020-160403

(51) Int. Cl.
*H04N 1/00* (2006.01)
*H04N 1/29* (2006.01)

(52) U.S. Cl.
CPC ..... *H04N 1/00087* (2013.01); *H04N 1/00015* (2013.01); *H04N 1/00037* (2013.01);
(Continued)

(58) Field of Classification Search
CPC ........... H04N 1/00015; H04N 1/00037; H04N 1/00042; H04N 1/00087; H04N 1/2338; H04N 1/29; H04N 1/32625; H04N 1/32635; H04N 1/32673; H04N 1/32683; G06K 15/408–409; G06F 3/121; G06F 3/1234

See application file for complete search history.

(56) References Cited

U.S. PATENT DOCUMENTS 5,913,090 A 6/1999 Sawada et al.
7,243,270 B2 * 7/2007 Taniguchi ............. G06F 11/008
358/1.14

(Continued)

FOREIGN PATENT DOCUMENTS

| JP | 9-321931 | 12/1997 |
|---|---|---|
| JP | 2012-073923 | 4/2012 |
| JP | 2015-036808 | 2/2015 |

*Primary Examiner* — Scott A Rogers
(74) *Attorney, Agent, or Firm* — Xsensus LLP

(57) ABSTRACT

A device management system includes a device management apparatus; and a plurality of devices connectable to the device management apparatus. The device management apparatus includes circuitry configured to receive a notice of failure risk condition from the plurality of devices; in response to receiving a notice indicating that a first condition of the failure risk condition is satisfied from a first device, transmit to the first device a change request for changing the failure risk condition from the first condition to a second condition; identify, based on similarity between information stored for the first device and the plurality of devices other than the first device, a second device that is to be monitored using the same monitoring condition used for the first device; and transmit, to the second device, the change request for changing the failure risk condition from the first condition to the second condition.

6 Claims, 15 Drawing Sheets

(52) U.S. Cl.
CPC ..... *H04N 1/00042* (2013.01); *H04N 1/00344* (2013.01); *H04N 1/29* (2013.01); *H04N 2201/0082* (2013.01)

(56) References Cited

U.S. PATENT DOCUMENTS

| | | | |
|---|---|---|---|
| 2005/0240376 A1* | 10/2005 | Uwatoko | H04N 1/00015 702/183 |
| 2010/0225961 A1* | 9/2010 | Matsuda | H04N 1/32683 358/1.15 |
| 2012/0075659 A1 | 3/2012 | Sawada et al. | |
| 2015/0227447 A1* | 8/2015 | Adachi | H04N 1/00042 358/1.14 |
| 2019/0278529 A1* | 9/2019 | Yeung | H04N 1/00079 |
| 2021/0011670 A1* | 1/2021 | Motoyama | G06F 3/1251 |

* cited by examiner

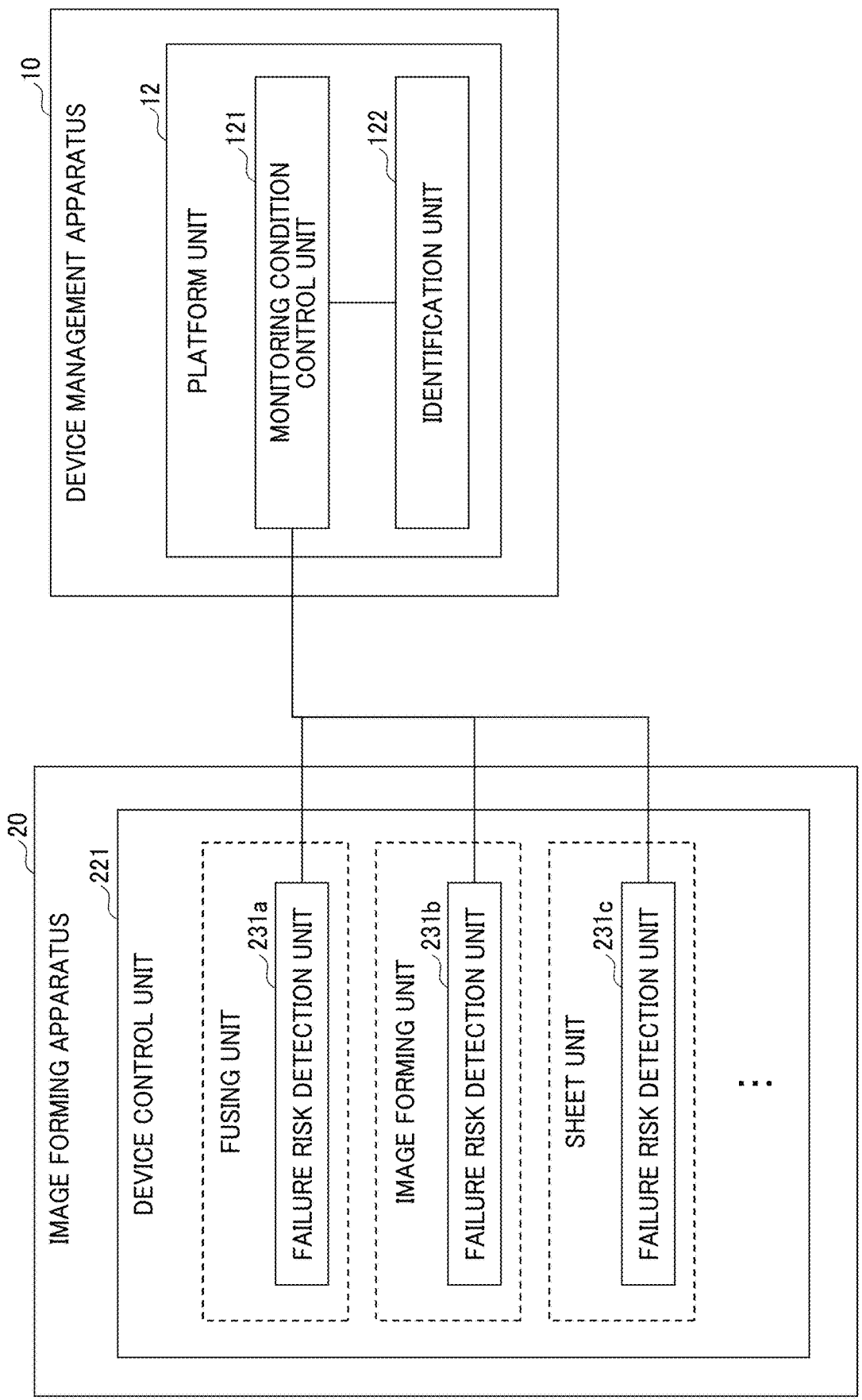

FIG. 6

| CONTROL TARGET UNIT | FAILURE DETECTION LEVEL | FAILURE RISK DETECTION CONDITION |
|---|---|---|
| FUSING UNIT | LEVEL 1 | (a) FUSING READY TIME IS 70% OR MORE OF FUSING ERROR CONDITION, OR<br>(b) MONITOR FUSING MOTOR TORQUE USING CURRENT VALUE OF DC BRUSHLESS MOTOR, AND CURRENT VALUE BECOMES 110% OR MORE OF REFERENCE VALUE |
| FUSING UNIT | LEVEL 2 | (a) FUSING READY TIME IS "90% OR MORE OF FUSING ERROR CONDITION, OR<br>(b) MONITOR FUSING MOTOR TORQUE USING CURRENT VALUE OF DC BRUSHLESS MOTOR, AND CURRENT VALUE BECOMES 125% OR MORE OF REFERENCE VALUE |
| IMAGE FORMING UNIT | LEVEL 1 | CALCULATE LAYER THICKNESS OF PHOTOSENSITIVE MEMBER FROM A RELATIONSHIP OF CHARGE BIAS AND CHARGE CURRENT FOR A PLURALITY OF PATCHES WHEN PERFORMING PROCESS CONTROL, AND LAYER THICKNESS OF PHOTOSENSITIVE BECOMES 80% OF REFERENCE VALUE |
| IMAGE FORMING UNIT | LEVEL 2 | CALCULATE LAYER THICKNESS OF PHOTOSENSITIVE MEMBER FROM A RELATIONSHIP OF CHARGE BIAS AND CHARGE CURRENT FOR A PLURALITY OF PATCHES WHEN PERFORMING PROCESS CONTROL, AND LAYER THICKNESS OF PHOTOSENSITIVE BECOMES 60% OF REFERENCE VALUE |
| SHEET UNIT | LEVEL 1 | JAMMING OCCURS AT ANY OF A PLURALITY OF CONVEYING SENSORS |
| SHEET UNIT | LEVEL 2 | WHEN JAMMING OCCURS AT CONVEYING SENSOR, MONITOR SHEET ARRIVAL TIME/SHEET PASSING TIME FOR CONVEYING SENSOR, AND TIME BECOMES 70% OR MORE OF JAMMING DETECTION CONDITION |
| SHEET UNIT | LEVEL 3 | WHEN JAMMING OCCURS AT CONVEYING SENSOR, MONITOR SHEET ARRIVAL TIME/SHEET PASSING TIME FOR CONVEYING SENSOR, AND TIME BECOMES 90% OR MORE OF JAMMING DETECTION CONDITION |

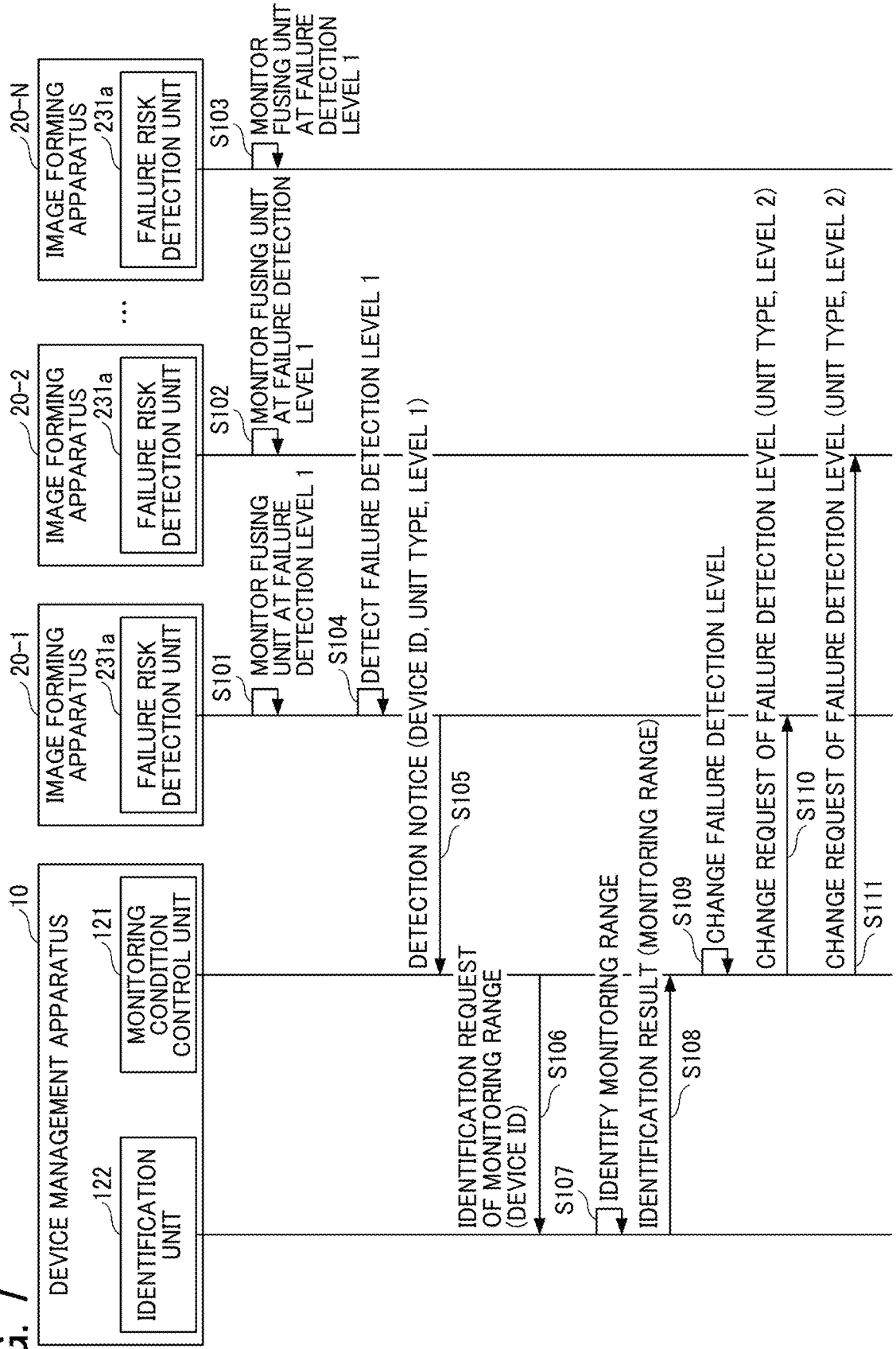

FIG. 11

| | USE STYLE OF USER | ABNORMALITY HAVING HIGHER RISK OF OCCURRENCE | CAUSE |
|---|---|---|---|
| SHEET | PRINTING USING THIN SHEET | SHEET WRINKLE | INCREASE OR DECREASE OF FUSING NIP WIDTH DUE TO DETERIORATION OF RUBBER LAYER OF FUSING ROLLER |
| | PRINTING USING THICK SHEET | MISALIGNMENT OF PRINT POSITION ON FRONT AND REAR FACES FOR DOUBLE-SIDED PRINTING | FLUCTUATION IN SHEET FEED SPEED DUE TO DETERIORATION OF SHEET TRANSPORT ROLLERS |
| PRINTED IMAGE | USING COLOR PRINTING OPERATION MANY TIMES | ADHERING (JAMMING) OF SHEET AT FUSING PROCESS | FLUCTUATION IN SEPARATION PERFORMANCE OF FUSING BELT AND SHEET DUE TO ABRASION OF FUSING BELT |
| | USING MONOCHROME PRINTING OPERATION MANY TIMES AND ALSO USING COLOR PRINTING OPERATION AT SOME TIME | FORMING ABNORMAL IMAGES (WHEN COLOR PRINTING OPERATION) | LATENT IMAGE FORMED ON DETERIORATED SURFACE OF C, M, AND Y DRUMS AND DETERIORATION OF TONER IMAGE QUALITY DUE TO DETERIORATION OF BLADE MEMBER |

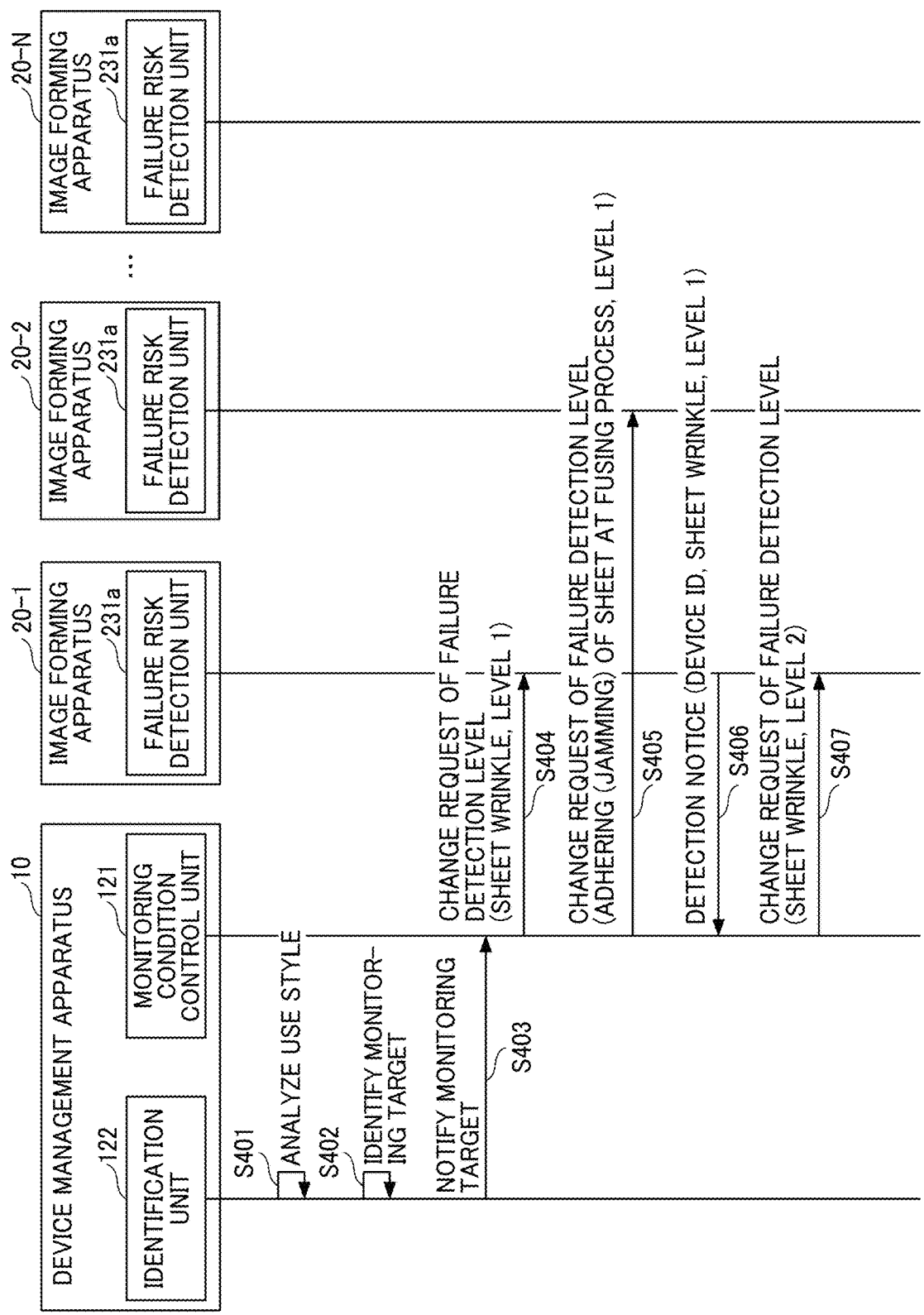

FIG. 14

| CLASSIFICATION CONDITION | MONITORING TARGET |
|---|---|
| USE RATIO OF THIN SHEET IS EQUAL TO OR GREATER THAN $\alpha$% FOR PRINTED SHEET | SHEET WRINKLE |
| USE RATIO OF THICK SHEET IS EQUAL TO OR GREATER $\beta$% FOR PRINTED SHEET | MISALIGNMENT OF PRINT POSITION ON FRONT AND REAR FACES FOR DOUBLE-SIDED PRINTING |
| USE RATIO OF YMCK IS EQUAL TO OR GREATER THAN $\gamma$% FOR PRINTED IMAGE | ADHERING (JAMMING) OF SHEET AT FUSING PROCESS |
| USE RATIO OF K IS EQUAL TO OR GREATER THAN $\Delta$% FOR PRINTED IMAGE | DRUM IMAGE ABNORMALITY |

US 11,172,075 B2

DEVICE MANAGEMENT SYSTEM, APPARATUS, AND DEVICE INVOLVING REQUEST TO CHANGE TO A HIGHER FAILURE RISK CONDITION THAT CHANGES THE TARGET DEVICE MONITORING CONDITION

CROSS-REFERENCE TO RELATED APPLICATION

This application claims priority pursuant to 35 U.S.C. § 119(a) to Japanese Patent Applications Nos. 2019-214516, filed on Nov. 27, 2019 and 2020-160403, filed on Sep. 25, 2020 in the Japan Patent Office, the disclosure of which are incorporated by reference herein in its entirety.

BACKGROUND

Technical Field

This disclosure relates to a device management system, a device management apparatus, and a device.

Background Art

A technology for predicting occurrence of abnormality in image forming apparatuses based on respective states of image forming apparatuses is being studied and developed.

For example, the conventional management apparatus receives a plurality of items of state data generated at an image forming apparatus based on system control data, from the image forming apparatus via a network, and determines an indication of failure of each image forming unit of the image forming apparatus based on the received state data.

SUMMARY

As one aspect of the present disclosure, a device management system is devised. The device management system includes a device management apparatus; and a plurality of devices connectable to the device management apparatus via a network. The device management apparatus includes circuitry configured to receive a notice of failure risk condition from each of the plurality of devices; in response to receiving a notice indicating that a first condition of the failure risk condition is satisfied from a first device among the plurality of devices, transmit to the first device a change request for changing the failure risk condition from the first condition to a second condition indicating a failure risk condition having a higher failure risk than that of the first condition to change a monitoring condition of a monitoring target of the first device; identify, based on similarity between information stored for the first device and information stored for each of the plurality of devices other than the first device, a second device that is to be monitored using the same monitoring condition used for the first device from the plurality of devices other than the first device; and transmit, to the second device, the change request for changing the failure risk condition from the first condition to the second condition.

As another aspect of the present disclosure, a device management apparatus is devised. The device management apparatus includes circuitry configured to receive a notice of failure risk condition from each of the plurality of devices; in response to receiving a notice indicating that a first condition of the failure risk condition is satisfied from a first device among the plurality of devices, transmit to the first device a change request for changing the failure risk condition from the first condition to a second condition indicating a failure risk condition having a higher failure risk than that of the first condition to change a monitoring condition of a monitoring target of the first device; identify, based on similarity between information stored for the first device and information stored for each of the plurality of devices other than the first device, a second device that is to be monitored using the same monitoring condition used for the first device from the plurality of devices other than the first device; and transmit, to the second device, the change request for changing the failure risk condition from the first condition to the second condition.

As another aspect of the present disclosure, a device connectable to a device management apparatus via a network is devised. The device includes circuitry configured to transmit a notice indicating that a first condition of failure risk condition, set as a monitoring condition of a monitoring target, is satisfied to the device management apparatus; receive, from the device management apparatus, a change request for changing the failure risk condition from the first condition to a second condition indicating a failure risk condition having a higher failure risk than that of the first condition to change the monitoring condition of the monitoring target of the device; and start to monitor the monitoring target of the device using the second condition.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5 is an example of configuration of functional block diagram of a device management apparatus and an image forming apparatus according to the first embodiment;

FIG. 6 is an example of failure detection level and failure risk detection condition;

FIG. 7 is an example of a sequence diagram illustrating first processing procedure of changing a failure detection level;

FIG. 11 is an example of table illustrating abnormality having higher risk of occurrence depending on use style of user of image forming apparatus;

FIG. 13 is a sequence diagram illustrating an example of first processing procedure of change processing of failure detection level according to the third embodiment;

FIG. 14 is an example of table indicating classification information of monitoring target.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Figure 1:
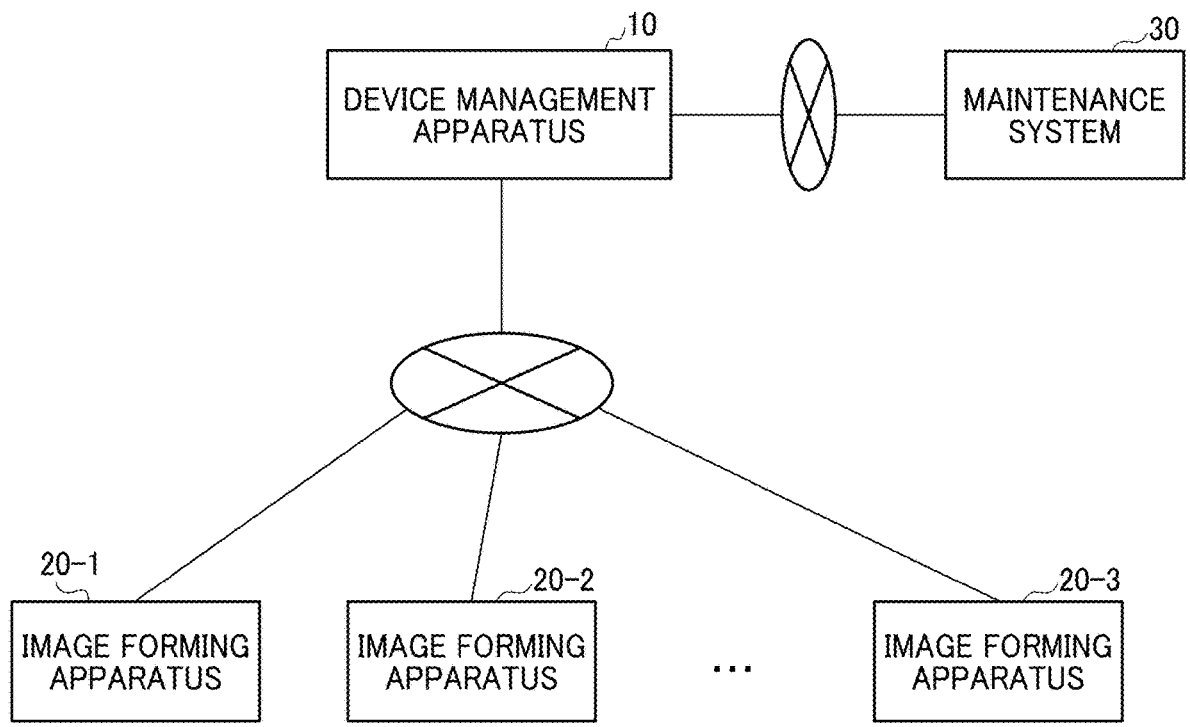
FIG. 1 is an example of configuration of a device management system according to a first embodiment.

Hereinafter, a description is given of a first embodiment of this disclosure with reference to the accompanying drawings. FIG. 1 is an example of configuration of a device management system 1 according to the first embodiment. In this disclosure, the device may also mean apparatus, machine, equipment, or the like, which can be managed by the device management system 1.

As illustrated in FIG. 1, the device management system 1 includes, for example, a device management apparatus 10, a plurality of image forming apparatuses 20 (e.g., image forming apparatus 20-1, image forming apparatus 20-2, . . . , image forming apparatus 20-N), and a maintenance system 30. The device management apparatus 10 is connected to the plurality of image forming apparatuses 20, and the maintenance system 30 with each other via a network, such as the Internet or the like. Each of the image forming apparatuses 20 may be connected to the device management apparatus 10, for example, via a base station using high-speed radio communication, such as 5G.

Each of the image forming apparatuses 20 is, for example, a multifunction apparatus. Hereinafter, the plurality of image forming apparatuses 20 may be simply referred to as the image forming apparatus 20. In the embodiment, if the image forming apparatus 20 detects that a condition indicating a failure risk (probability of failure) is satisfied, the image forming apparatus 20 transmits a notification of detecting the condition satisfying the failure risk (hereinafter, referred to as "detection notice") to the device management apparatus 10. In the embodiment, the image forming apparatuses 20 is an example of device managed by the device management system 1.

The device management apparatus 10 is one or more computers that monitor the image forming apparatus 20. For example, the device management apparatus 10 may be configured as a cloud system.

When the device management apparatus 10 receives a detection notice from any of the image forming apparatuses 20 (i.e., the transmission source of the detection notice), the device management apparatus 10 identifies other image forming apparatus 20 used in a style similar to a usage (i.e., use style) of the image forming apparatus 20 (i.e., the transmission source of the detection notice), and then the device management apparatus 10 requests the image forming apparatus 20 (i.e., the transmission source of the detection notice) and the identified other image forming apparatus 20 to monitor whether a condition indicating a state causing a higher failure risk (probability) is satisfied.

The maintenance system 30 is one or more computers that perform processing on maintenance services of each of the image forming apparatuses 20.

Figure 2:
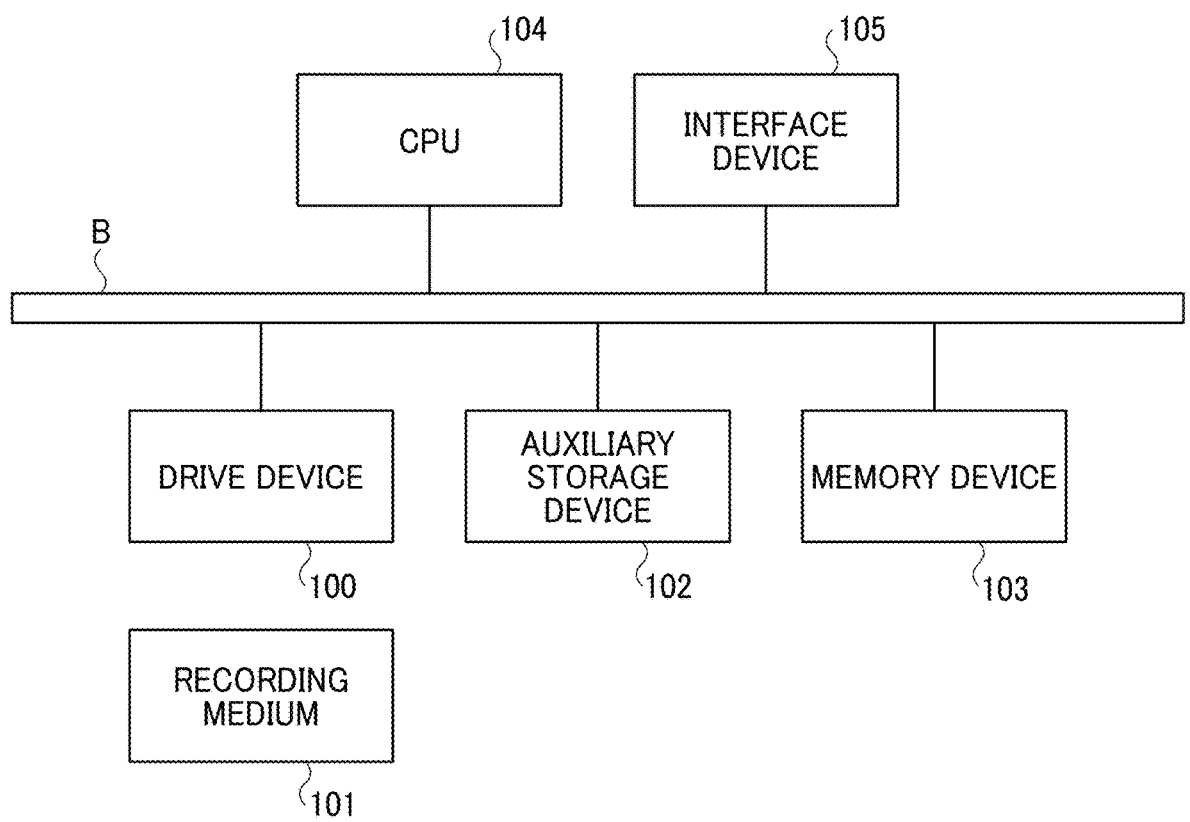
FIG. 2 is an example of configuration of hardware block diagram of a device management apparatus according to the first embodiment.

FIG. 2 is an example of configuration of hardware block diagram of the device management apparatus 10 according to the first embodiment. As illustrated in FIG. 2, the device management apparatus 10 includes, for example, a drive device 100, an auxiliary storage device 102, a memory device 103, a central processing unit (CPU) 104, and an interface device 105 connected with each other via bus B.

The program for implementing the processing in the device management apparatus 10 is provided by a recording medium 101, such as compact disk read only memory (CD-ROM). When the recording medium 101 storing the program is connected to the drive device 100, the program is installed on the auxiliary storage device 102 from the recording medium 101 via the drive device 100. However, the program installation is not required to be performed from the recording medium 101, but can be downloaded from another computer via the network. The auxiliary storage device 102 stores the installed program and required files and data.

The memory device 103 reads out the program from the auxiliary storage device 102 when an activation of the program is instructed. The CPU 104 performs functions related to the device management apparatus 10 according to the program stored in the memory device 103. The interface device 105 is used as an interface to connect to the network.

Figure 3:
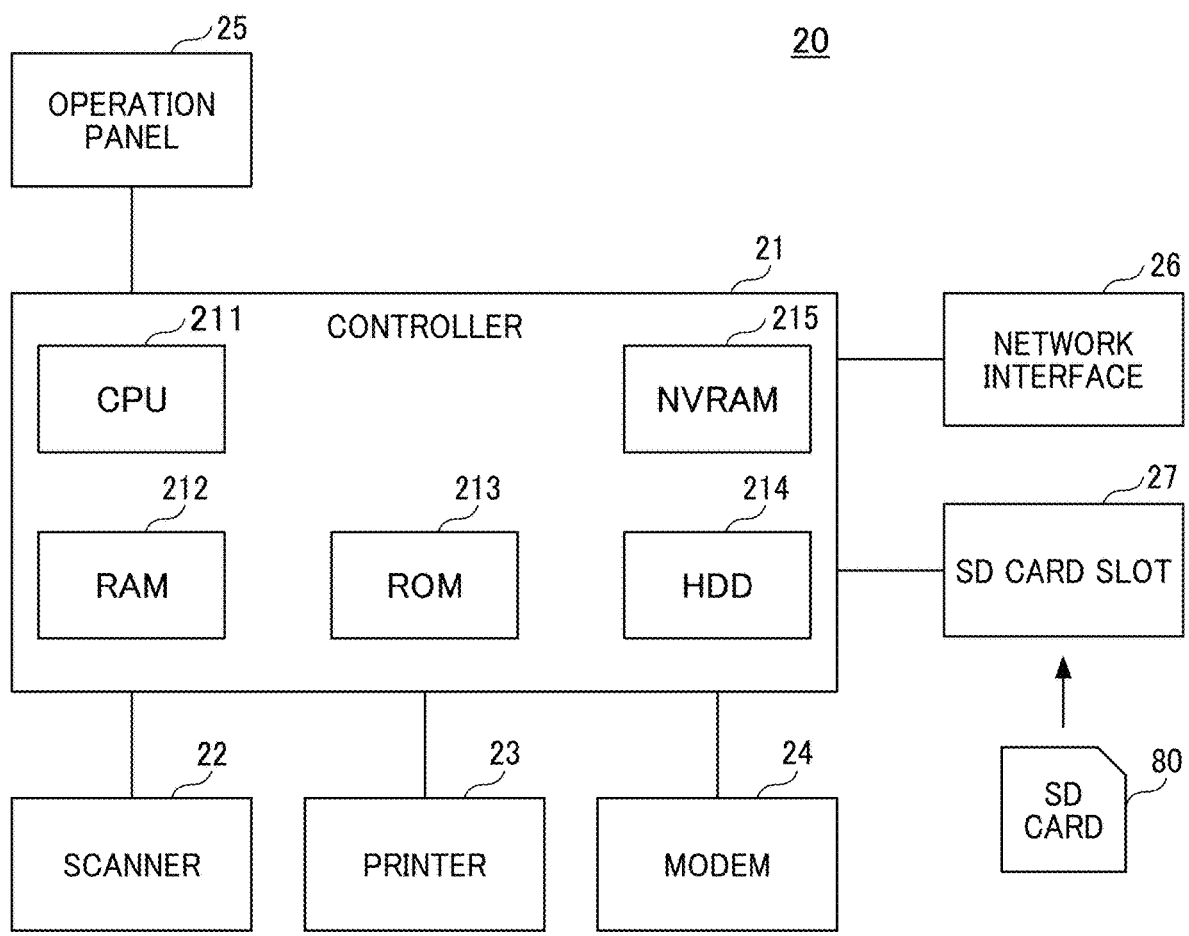
FIG. 3 is an example of configuration of hardware block diagram of an image forming apparatus according to the first embodiment.

FIG. 3 is an example of configuration of hardware block diagram of the image forming apparatus 20 according to the first embodiment. As illustrated in FIG. 3, the image forming apparatus 20 includes, for example, a controller 21, a scanner 22, a printer 23, a modem 24, an operation panel 25, a network interface 26, and a secure digital (SD) card slot 27 as hardware resources.

As illustrated in FIG. 3, the controller 21 includes, for example, a CPU 211, a random access memory (RAM) 212, a read only memory (ROM) 213, a hard disk drive (HDD) 214, and a non-volatile RAM (NVRAM) 215.

The ROM 213 stores various programs and data used by various programs. The RAM 212 is used as a storage area for loading a program, a work area of a loaded program, or the like. The CPU 211 implements various functions by executing programs loaded on the RAM 212. The HDD 214 stores various programs and data used by various programs. The NVRAM 215 stores various setting information or the like.

The scanner 22 is a hardware (i.e., image scanning device) used for scanning image data from document.

The printer 23 is a hardware (i.e., printing apparatus) used for printing print data on print sheet.

The modem 24 is a hardware used for connecting to, for example, a telephone line, and is used to transmit and receive image data using facsimile communication.

The operation panel 25 includes, for example, an input unit, such as a button for receiving an input from a user, a display unit, such as a liquid crystal panel or the like. The liquid crystal panel may have a touch panel function. In this case, the liquid crystal panel also serves as a function of the input unit. However, the operation panel 25 may not be a dedicated panel installed on the image forming apparatus 20. In this case, a personal computer (PC), smart phone or tablet apparatus may be used as the operation panel 25.

The network interface 26 is a hardware for connecting to a network, such as local area network (LAN), using wired or wireless communication.

The SD card slot 27 is used to read one or more programs stored in a SD card 80. That is, as to the image forming apparatus 20, not only programs stored in the ROM 213 but also programs stored in the SD card 80 can be loaded onto the RAM 212 and executed.

Further, the SD card 80 may be replaced or substituted by another recording medium, such as compact disk ROM (CD-ROM) or universal serial bus (USB) memory. That is, the type of recording medium corresponding to the SD card 80 is not limited to a predetermined one. In this case, the SD card slot 27 may be replaced by a hardware corresponding to the type of the recording medium.

Figure 4:
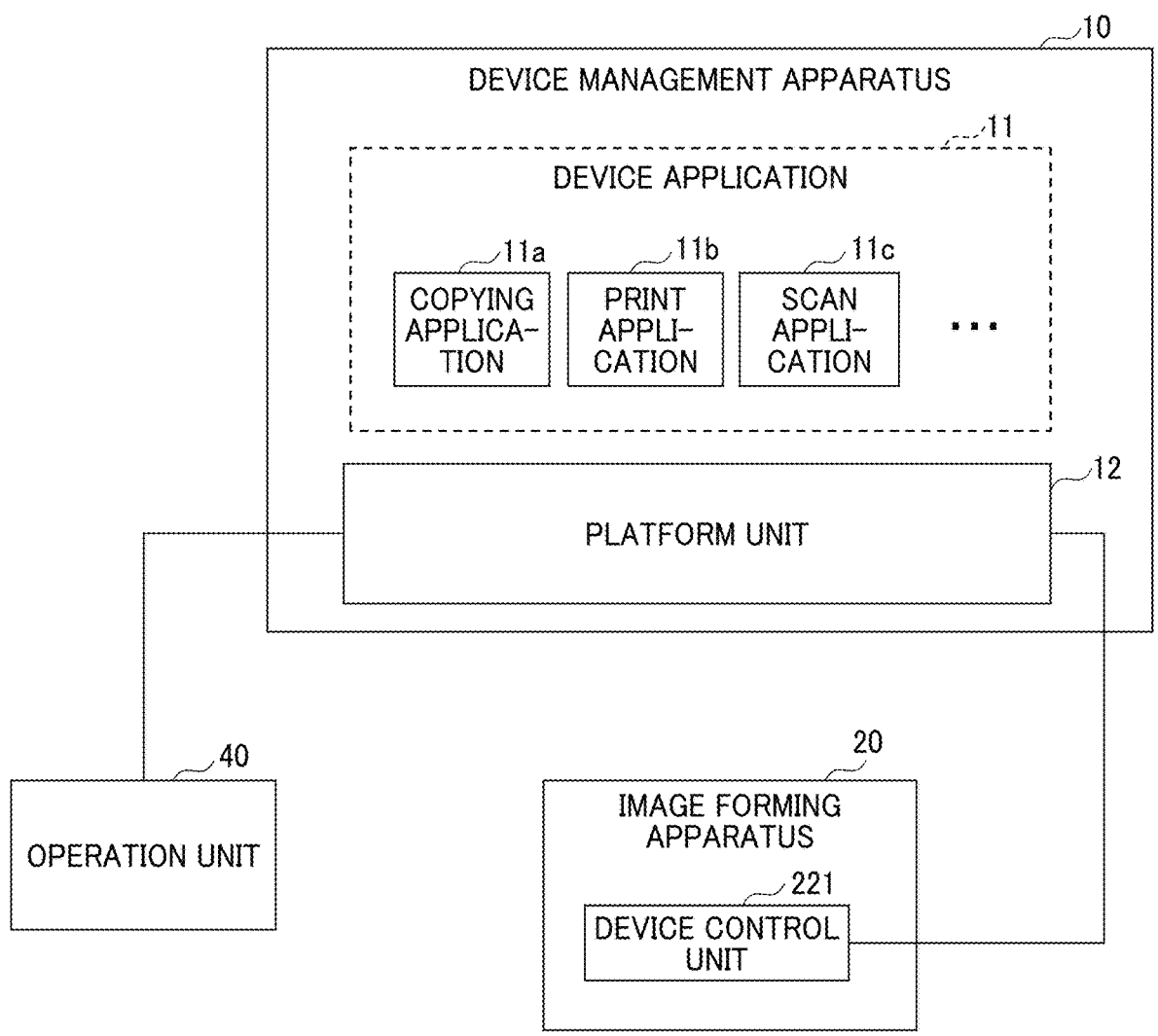
FIG. 4 is an example of software architecture of a device management apparatus and an image forming apparatus according to the first embodiment.

FIG. 4 is an example of software architecture of the device management apparatus 10 and the image forming apparatus 20 according to the first embodiment. In FIG. 4, an operation unit 40 corresponds to the operation panel 25, or a personal computer (PC) or a tablet terminal, which is used instead of the operation panel 25.

As illustrated in FIG. 4, the device management apparatus 10 includes, for example, one or more device applications 11, such as copying application 11a, print application 11b, scan application 11c, and a platform unit 12. The one or more device applications 11 are implemented by executing one or more programs installed on the device management apparatus 10 by the CPU 104.

The device application 11 is an application program used for the image forming apparatus 20.

For example, the copying application 11a is a device application 11, which causes the image forming apparatus 20 to perform copying.

The print application 11b is a device application 11, which causes the image forming apparatus 20 to perform printing.

The scan application 11c is a device application 11, which causes the image forming apparatus 20 to perform scanning.

The platform unit 12 functions as an application platform for the device application 11. For example, the platform unit 12 provides an application program interface (API) to the device application 11, and performs processing corresponding to a calling of the API from the device application 11.

Further, when the platform unit 12 receives a display request of screen for any one of the device applications 11 from the operation unit 40, the platform unit 12 notifies the display request to the concerned device application 11.

Then, the platform unit 12 receives screen data (e.g., web page) of an operation screen of the device application 11 as a response to the display request from the device application 11, and then the platform unit 12 transmits the screen data (e.g., web page) of an operation screen to the operation unit 40.

Then, the operation unit 40 displays the operation screen based on the screen data. Then, a user can designate the execution condition of the device application 11 (e.g., list of the image forming apparatus 20 that can be used, print number, monochrome/color, and scanning condition) on the operation screen. When the user inputs the execution condition to the operation screen, the operation unit 40 transmits the execution condition to the platform unit 12.

Then, the platform unit 12 notifies the execution condition to the device application 11. When the platform unit 12 receives an execution request of a job designating the execution condition from the device application 11, the platform unit 12 requests an execution instruction of processing related to the job to the image forming apparatus 20 designated as the execution destination of the job, and also manages the progress status of the job at the image forming apparatus 20 based on the communication with the image forming apparatus 20.

The image forming apparatus 20 includes a device control unit 221. The device control unit 221 provides an API for controlling hardware resources, such as the scanner 22 and the printer 23, and receives an execution instruction transmitted from the platform unit 12 of the device management apparatus 10 via the API. The device control unit 221 executes processing corresponding to the received execution instruction, and transmits an execution result to the platform unit 12.

Conventionally, the device application 11 and the platform unit 12 are installed on the image forming apparatus 20. On the other hand, as illustrated in FIG. 4, as to the first embodiment, the device application 11 and the platform unit 12 are installed on the device management apparatus 10. For example, the device application 11 may be installed as a web application. With this configuration, a version upgrading of the device application 11 or the platform unit 12 for each of the image forming apparatuses 20 can be performed by updating the device management apparatus 10, with which the burden of the maintenance work of the image forming apparatus 20 can be reduced.

Further, the device management apparatus 10 may not be configured by a centralized server group. For example, an edge computing having the configuration similar to the device management apparatus 10 of FIG. 4 may be implemented by a plurality of servers distributed in offices or regions. With this configuration, a higher response speed (higher real-time performance) of each function of the image forming apparatus 20 can be secured easily.

FIG. 5 is an example of configuration of functional block diagram of the device management apparatus 10 and the image forming apparatus 20 according to the first embodiment.

As illustrated in FIG. 5, the device control unit 221 of the image forming apparatus 20 includes, for example, failure risk detection unit 231a, failure risk detection unit 231b, and failure risk detection unit 231c corresponding to each control target unit, such as fusing unit, image forming unit, and sheet unit. Hereinafter, the failure risk detection unit 231a, failure risk detection unit 231b, and failure risk detection unit 231c may be simply referred to as "failure risk detection unit 231."

The failure risk detection unit 231 monitors whether a failure risk detection condition corresponding to a failure detection level set for each control target unit is satisfied.

The failure detection level is a condition indicating a probability of failure (hereinafter, referred to as "failure risk detection condition"), and the failure detection level is expressed using a form of "level N," such as level 1, level 2, and so on (N is one or more integers). In the embodiment, the greater the value of N, the higher the risk (probability) of failure. That is, in the embodiment, the failure detection level is defined as a plurality of stages, and the failure risk detection condition corresponding to the failure detection level of each stage is defined.

FIG. 6 is an example of failure detection level and failure risk detection condition. As illustrated in FIG. 6, the failure risk detection conditions in accordance with the respective failure detection levels, such as level 1, level 2, and level 3, are set for each control target unit. The contents of each failure risk detection condition illustrated in FIG. 6 are only one example, in which the higher the value of N of the level N, the higher the probability of the failure.

For example, as to the fusing unit, the failure risk detection condition (a) at level 1 is "fusing ready time is equal to or greater than 70% of fusing error condition," and the failure risk detection condition (a) at level 2 is "fusing ready time is equal to or greater than "90% of fusing error condition". That is, as to the same parameter (e.g., fusing ready time), the condition of 70% or greater set for the level 1 is increased to the condition of 90% or greater set for the level 2. The same applies to other failure risk detection conditions.

The information illustrated in FIG. 6 is stored, for example, in the HDD 214 of the image forming apparatus 20.

As illustrated in FIG. 5, the platform unit 12 of the device management apparatus 10 includes, for example, monitoring condition control unit 121, and identification unit 122.

The monitoring condition control unit 121 requests the respective image forming apparatuses 20 to change the failure detection level. When the monitoring condition control unit 121 receives a notice (hereinafter, referred to as "detection notice") indicating that the failure risk detection condition corresponding to the failure detection level set for the failure risk detection unit 231 is satisfied (detecting a failure risk corresponding to the failure detection level), from the failure risk detection unit 231 of any control target unit of any image forming apparatus 20, the monitoring condition control unit 121 instructs the concerned image forming apparatus 20 to change the failure detection level.

That is, one failure risk detection condition of the image forming apparatus 20 (monitoring target) is changed to another failure risk detection condition indicating a state, in which the probability of the failure is higher. The failure detection level may shift between the levels, such as level 1→level 2→level 3.

Based on the similarity of usage (i.e., use style) of the image forming apparatus 20 of the transmission source that has transmitted the detection notice and the other image forming apparatus 20, the identification unit 122 identifies a group of other image forming apparatuses 20 (hereinafter, referred to as "monitoring range") to be monitored using the same failure risk detection condition (changing to the same failure detection level) applied to the image forming apparatus 20 of the transmission source that has transmitted the detection notice. The similarity of usage (i.e., use style) is used because the image forming apparatus 20 used under the similar condition are likely to occur similar failures, which is known based on the experiences.

The similarity of usage (i.e., use style) is determined based on information on each of the image forming apparatuses 20 stored in the device management apparatus 10. That is, the monitoring range is identified based on the similarity of information on each of the image forming apparatuses 20 stored in the device management apparatus 10.

For example, the monitoring range is determined based on the similarity of usage history information of each of the image forming apparatuses 20 (hereinafter, referred to as "identification method M1").

The usage history information includes, for example, a history of execution condition of each job. Based on the execution condition, values of parameters, such as sheet type, sheet thickness, sheet size, sheet number, image type (e.g., solid image) of print target used in each job can be derived.

For example, in a past fixed period of time (e.g., past one month), the image forming apparatuses 20 having the similar values of these parameters are identified as the image forming apparatuses 20 used under the similar usage (i.e., use style). Further, the usage history information is stored in, for example, the auxiliary storage device 102.

Since the platform unit 12 of the device management apparatus 10 performs the job management of each of the image forming apparatuses 20, the platform unit 12 can recognize which job is executed at each of the image forming apparatuses 20 under which execution condition in real time.

Therefore, when the job is executed with respect to any of the image forming apparatuses 20, the platform unit 12 updates the usage history information of the concerned image forming apparatus 20.

Further, the "monitoring range" may be identified based on the similarity of information indicating the location of each of the image forming apparatuses 20 (hereinafter, referred to as "identification method M2"). This is because the image forming apparatuses 20, which are installed in the same place or work place (e.g., the same industry), are likely to be used in the similar manner.

The auxiliary storage device 102 stores attribute information of each of the image forming apparatuses 20 (hereinafter, referred to as "device information"). The device information includes information indicating the installation location of the target image forming apparatus 20 (hereinafter, referred to simply as "installation location").

The similarity of installation location may be determined by, for example, company name, or may be determined by company name and site (e.g., building, office), and may be determined by floor by floor. If a group of the image forming apparatuses 20 at the same installation location is used in the similar condition, and the same failure detection level is set to the group of the image forming apparatuses 20, the maintenance work can be performed efficiently by visiting the installation location of the group of the image forming apparatuses 20 by the maintenance worker.

Further, the monitoring range may be identified by combining the identification method M1 and the identification method M2. In this case, if the installation location is similar and the usage history information is similar, it is determined that the usage (i.e., use style) is similar.

Hereinafter, with reference to FIG. 7, a description is given of processing procedure to be performed in the device management system 1. FIG. 7 is an example of a sequence diagram illustrating first processing procedure of changing a failure detection level according to the first embodiment.

FIG. 7 indicates one example case, in which the failure risk detection unit 231*a* of the fusing unit of the respective image forming apparatus 20 is monitoring the failure risk at "failure detection level 1," which is the initial value of the failure detection level (steps S100, S102, S103). Further, the failure risk detection unit 231 of the other control target unit is also monitoring the failure risk.

In this situation, if the failure risk detection unit 231a of the image forming apparatus 20-1 (hereinafter, referred to as "target image forming apparatus 20") detects that the failure risk detection condition of the failure detection level 1 is satisfied (detection of the failure detection level 1) (step S104), the failure risk detection unit 231a of the target image forming apparatus 20 transmits the detection notice to the monitoring condition control unit 121 of the device management apparatus 10 (step S105). The detection notice includes, for example, identification information of the target image forming apparatus 20 (hereinafter, referred to as "device ID"), information indicating a type of the control target unit, such as the fusing unit (hereinafter, referred to as "unit type"), and current failure detection level (e.g., failure detection level 1).

When the monitoring condition control unit 121 receives the detection notice in step S105, the monitoring condition control unit 121 designates the device ID included in the detection notice, and transmits an identification request of monitoring range to the identification unit 122 (step S106).

In response to receiving the identification request, the identification unit 122 identifies or determines the monitoring range corresponding to the device ID of the image forming apparatus 20 (i.e., the target image forming apparatus 20) designated in the identification request (step S107).

For example, when the identification method M1 is adopted, the identification unit 122 identifies the monitoring range based on the usage history information of the target image forming apparatus 20 and the usage history information of the other image forming apparatuses 20.

Specifically, the identification unit 122 obtains a ratio of the value of each parameter of the target image forming apparatus 20, such as sheet type, sheet thickness, sheet size, sheet number, and image type (e.g., solid image) of print target in a pre-set period of time.

Specifically, as to sheet type, a ratio of job number of sheet type to the number of jobs in a pre-set period of time is obtained for each sheet type, such as plain paper and glossy paper. Similarly, a ratio of value is also obtained for other parameters. Each of the respective ratios obtained for the value of each parameter of the target image forming apparatus 20 is hereinafter referred to as a "reference value."

The identification unit 122 similarly obtains a ratio of the value of each parameter of other image forming apparatuses 20 in the pre-set period of time.

The identification unit 122 identifies or determines the monitoring range by comparing the ratio of value of parameter of each of the image forming apparatuses 20 with the reference value. For example, the image forming apparatus 20 having any one item having the ratio equal to or greater than the reference value may be included in the monitoring range. Alternatively, the image forming apparatus 20 having all items having the ratio equal to or greater than the reference value may be included in the monitoring range. Alternatively, the image forming apparatus 20 having a given number of items having the ratio equal to or greater than the reference value may be included in the monitoring range.

Alternatively, as another example of the identification method M1, the similarity of usage history information of the target image forming apparatus 20 and the usage history information of the other image forming apparatus 20 may be calculated. The method of calculating the similarity of usage history information may be determined appropriately. In this case, a group of image forming apparatuses 20 having the similarity of the upper M-th or a group of image forming apparatuses 20 having a similarity equal to or greater than a threshold (the higher the value, the higher the similarity) can be identified as the monitoring range.

On the other hand, when the identification method M2 is adopted, the identification unit 122 identifies the other image forming apparatus 20 related to the device information including the installation location that is the same as the installation location included in the device information of the target image forming apparatus 20, as the monitoring range.

Further, when the identification methods M1 and M2 are combined, some image forming apparatuses 20 are identified as the monitoring range by the identification method M2, and then the monitoring range is further identified by the identification method M1.

Then, the identification unit 122 transmits an identification result of the monitoring range to the monitoring condition control unit 121 (step S108). Specifically, the identification unit 122 transmits a list of the device ID of each of the image forming apparatuses 20 identified as the monitoring range to the monitoring condition control unit 121.

Then, the monitoring condition control unit 121 changes the failure detection level to another failure detection level, such as one stage above the failure detection level 1 notified in step S105, as a new failure detection level (step S109). In this example case, the monitoring condition control unit 121 sets the level 2, which is one stage above the level 1, as the new failure detection level.

Then, the monitoring condition control unit 121 transmits a change request of failure detection level to the target image forming apparatus 20 and the other image forming apparatus 20 included in the monitoring range (steps S110, S111). In this example case, the image forming apparatus 20-2 is included in the monitoring range. Therefore, the monitoring condition control unit 121 transmits the change request of failure detection level to the image forming apparatus 20-1 and the image forming apparatus 20-2. The change request includes, for example, the unit type (e.g., fusing unit) set as the change target of failure detection level, and the failure detection level (e.g., level 2) after changing the failure detection level.

When the failure risk detection unit 231a of the image forming apparatus 20 receives the change request, the failure risk detection unit 231a changes the failure detection level of the fusing unit to the level 2, and starts the monitoring whether the failure risk detection condition corresponding to the level 2 is satisfied.

Hereinafter, with reference to FIG. 8, a description is given of processing procedure to be performed when the highest level of failure risk is detected.

Figure 8:
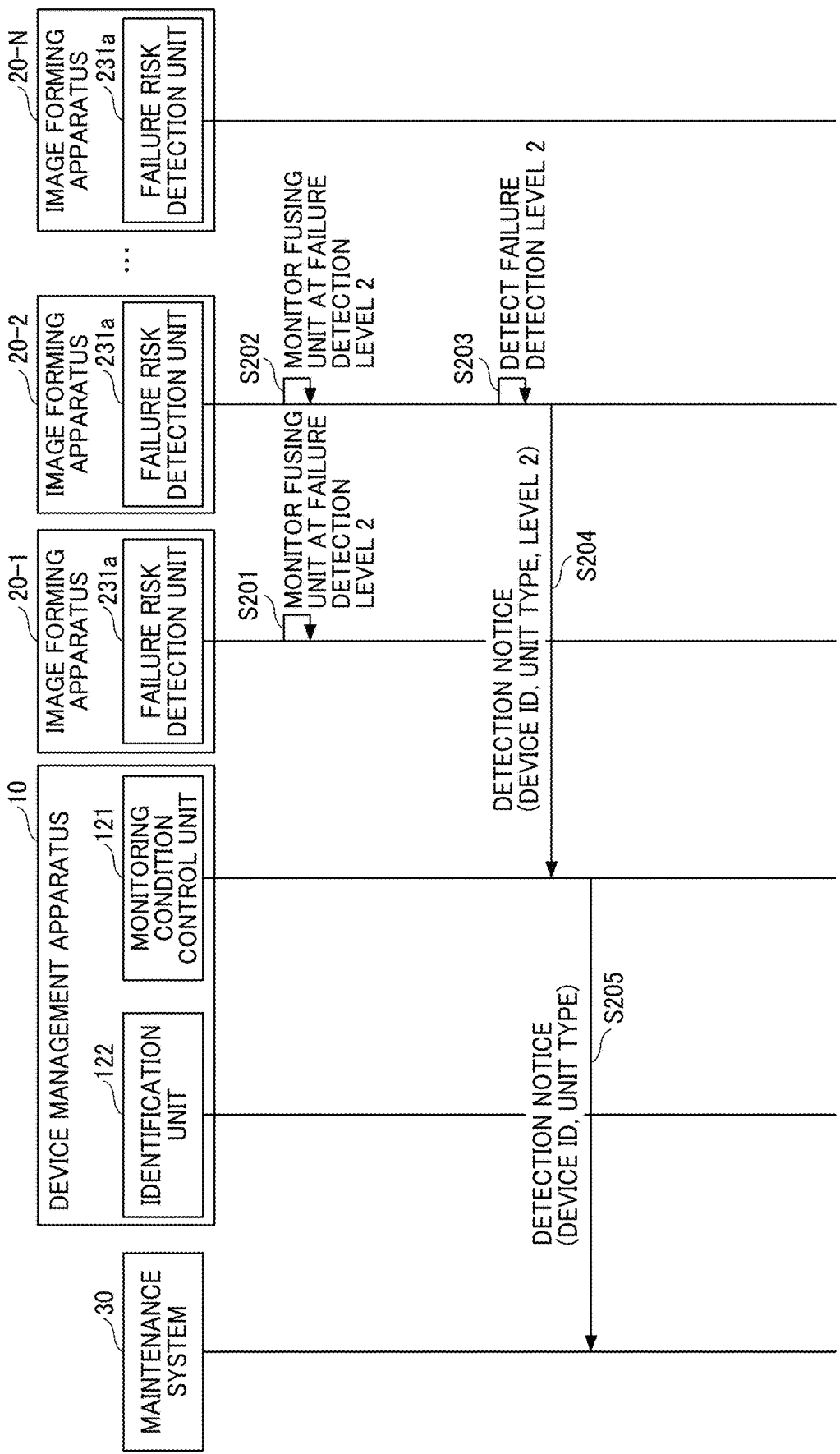
FIG. 8 is a sequence diagram illustrating an example of processing procedure to be performed when the highest level of failure risk is detected.

FIG. 8 is a sequence diagram illustrating an example of the processing procedure to be performed when the highest level of failure risk is detected according to the first embodiment. Further, FIG. 6 indicates an example in which the level 3 is the highest level, but in FIG. 8, the level 2 is set as the highest level for the convenience of description.

In FIG. 8, after performing the sequence of FIG. 7, it is assumed that the failure risk detection unit 231a of the fusing unit of the image forming apparatus 20-1 and the failure risk detection unit 231a of the fusing unit of the image forming apparatus 20-2 are monitoring the failure risk at the failure detection level 2 (steps S201, S202).

In this situation, if the failure risk detection unit 231a of the image forming apparatus 20-2 detects that the failure risk detection condition of the failure detection level 2 is satisfied (detection of the failure detection level 2) (step S203), the failure risk detection unit 231a of the image forming apparatus 20-2 transmits the detection notice to the monitoring condition control unit 121 of the device management apparatus 10 (step S204).

Then, the monitoring condition control unit 121 receives the detection notice, and if the failure detection level included in the detection notice is the highest level, the monitoring condition control unit 121 transmits the detection notice to the maintenance system 30 (step S205). In this example case, the detection notice transmitted to the maintenance system 30 may not include the failure detection level. This is because the detection notice is transmitted to the maintenance system 30 when the probability of failure is very high.

For example, the maintenance system 30 that receives the detection notice may transmit information indicating the failure risk to a terminal used by a service person who is assigned to the device ID included in the detection notice.

Further, the image forming apparatus 20-2 continues normal operation when no failure occurs in the fusing unit actually.

Figure 9:
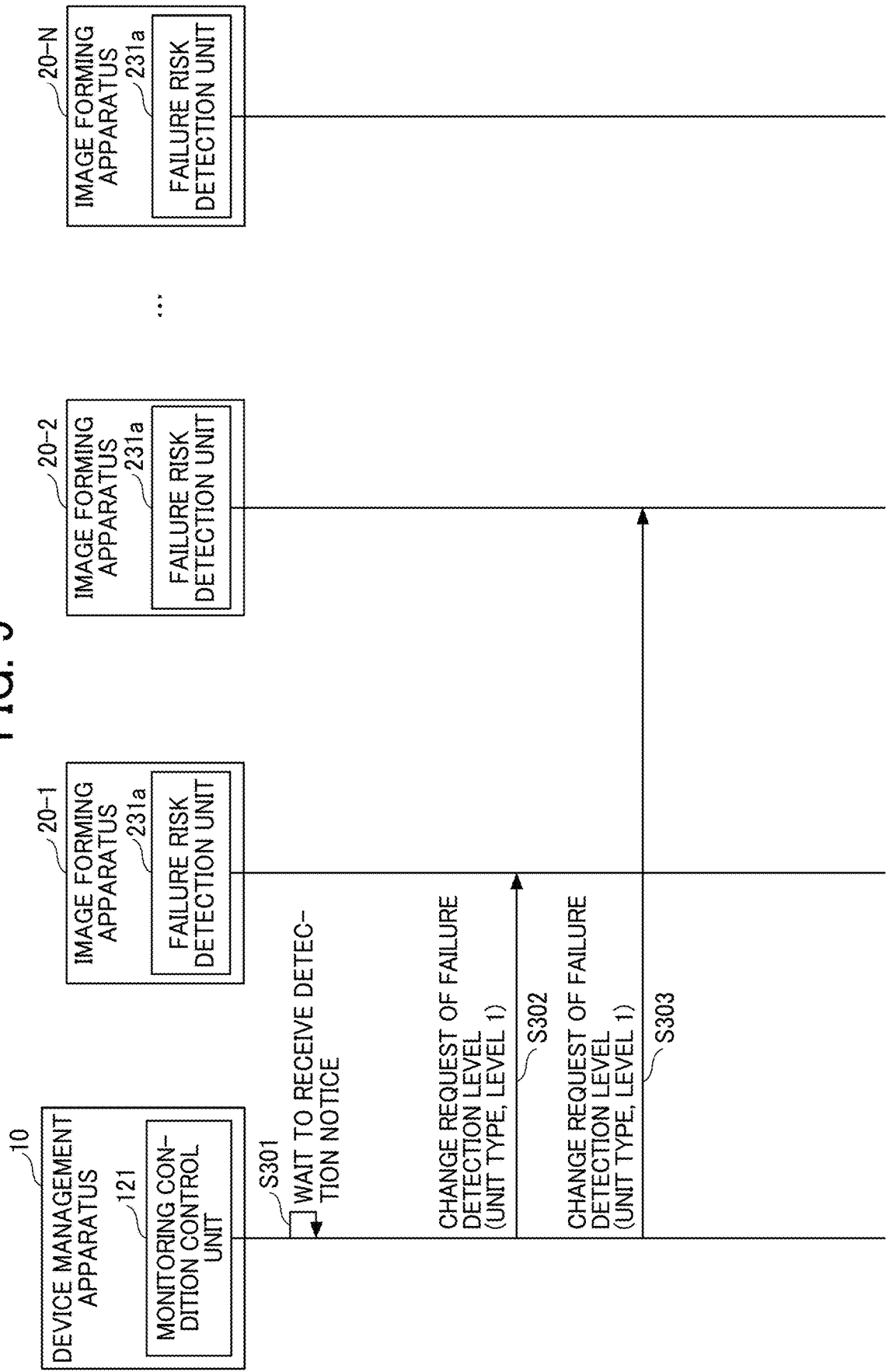
FIG. 9 is a sequence diagram illustrating an example of second processing procedure of changing a failure detection level.

Hereinafter, with reference to FIG. 9, a description is given of process of changing the failure detection level that is not triggered by the detection notice. FIG. 9 is a sequence diagram illustrating an example of second processing procedure of changing the failure detection level according to the first embodiment.

The monitoring condition control unit 121 waits to receive the detection notice (step S301). In step S301, the monitoring condition control unit 121 manages or monitors the date and time when the failure detection level was changed at the last time (i.e., most-recently changed date and time) and the failure detection level after the change (i.e., current failure detection level) for each of the image forming apparatuses 20 and for each control target unit.

For example, the most-recently changed date and time and the failure detection level of each control target unit of the image forming apparatus 20 may be stored in the memory device 103 or the auxiliary storage device 102.

While the monitoring condition control unit 121 waits to receive the detection notice, the monitoring condition control unit 121 monitors each control target unit of the image forming apparatus 20 whether the elapsed time from the most-recently changed date and time becomes a pre-set time period. For example, such monitoring can be performed efficiently by sorting a set of the image forming apparatus 20 and the control target unit in the chorological order of the most-recently changed date and time (from the oldest changed date and time), and monitoring the most-recently changed date and time with respect to the current date and time as a target of monitoring. The pre-set time period is, for example, a pre-set period of time used as a threshold value, such as one month.

In this case, after performing the sequence of FIG. 7, it is assumed that the pre-set time period has elapsed while the detection condition control unit 121 has not received the detection notice of the fusing unit of the image forming apparatus 20-1 and the image forming apparatus 20-2. In this case, the monitoring condition control unit 121 detects that the elapsed time from the most-recently changed date and time reaches the pre-set time period for each fusing unit (i.e., control target unit) of the image forming apparatus 20-1 and the image forming apparatus 20-2.

In response to detecting the elapsed time, the monitoring condition control unit 121 transmits a request for changing the failure detection level from the current failure detection level (e.g., level 2) to another failure detection level (e.g., level 1), which is one stage below the current failure detection level, to the image forming apparatus 20-1 and the image forming apparatus 20-2 (steps S302, 303). The change request of failure detection level includes, for example, information indicating a type of the control target unit (e.g., fusing unit) set as the change target of failure detection level, and the failure detection level after the change (e.g., level 1).

When the failure risk detection unit 231a of the image forming apparatus 20-1 and the failure risk detection unit 231a of the image forming apparatus 20-2 receive the change request, the failure risk detection unit 231a of the image forming apparatus 20-1 and the failure risk detection unit 231a of the image forming apparatus 20-2 change the failure detection level of the fusing unit (i.e., control target unit) to the level 1, and starts the monitoring whether the failure risk detection condition corresponding to the level 1 is satisfied.

By performing the processing procedure of FIG. 9, a state of keeping the failure detection level at a higher level even though the actual failure risk becomes lower can be prevented.

As described above, as to the first embodiment, the failure detection level (failure risk detection condition) is defined in a multiple stages, and as to the image forming apparatus 20 satisfying the failure risk detection condition corresponding to a certain failure detection level, the failure risk detection condition corresponding to the failure detection level is changed to the failure risk detection condition indicating a relatively higher probability of failure for the monitoring target.

Further, when the failure risk detection condition is changed for the image forming apparatus 20, based on the similarity of usage (i.e., use style) of the target image forming apparatus 20 of the transmission source that has transmitted the detection notice and the other image forming apparatus 20, the other image forming apparatus 20 to be monitored using the same failure risk detection condition set for the target image forming apparatus 20 is identified, and the failure risk detection condition is also changed for the identified other image forming apparatus 20.

Therefore, the monitoring range can be limited to the target image forming apparatus 20 that transmits the detection notice corresponding to the relatively higher failure detection level, and the other image forming apparatus 20 that is estimated to have a relatively higher failure risk. As a result, the communication load between the image forming apparatus 20 and the device management apparatus 10 can be reduced while the image forming apparatus 20 can be monitored efficiently.

Hereinafter, a description is given of a second embodiment of this disclosure. The second embodiment describes points different from the first embodiment. Therefore, the point which is not specifically described may be the same as in the first embodiment.

Figure 10:
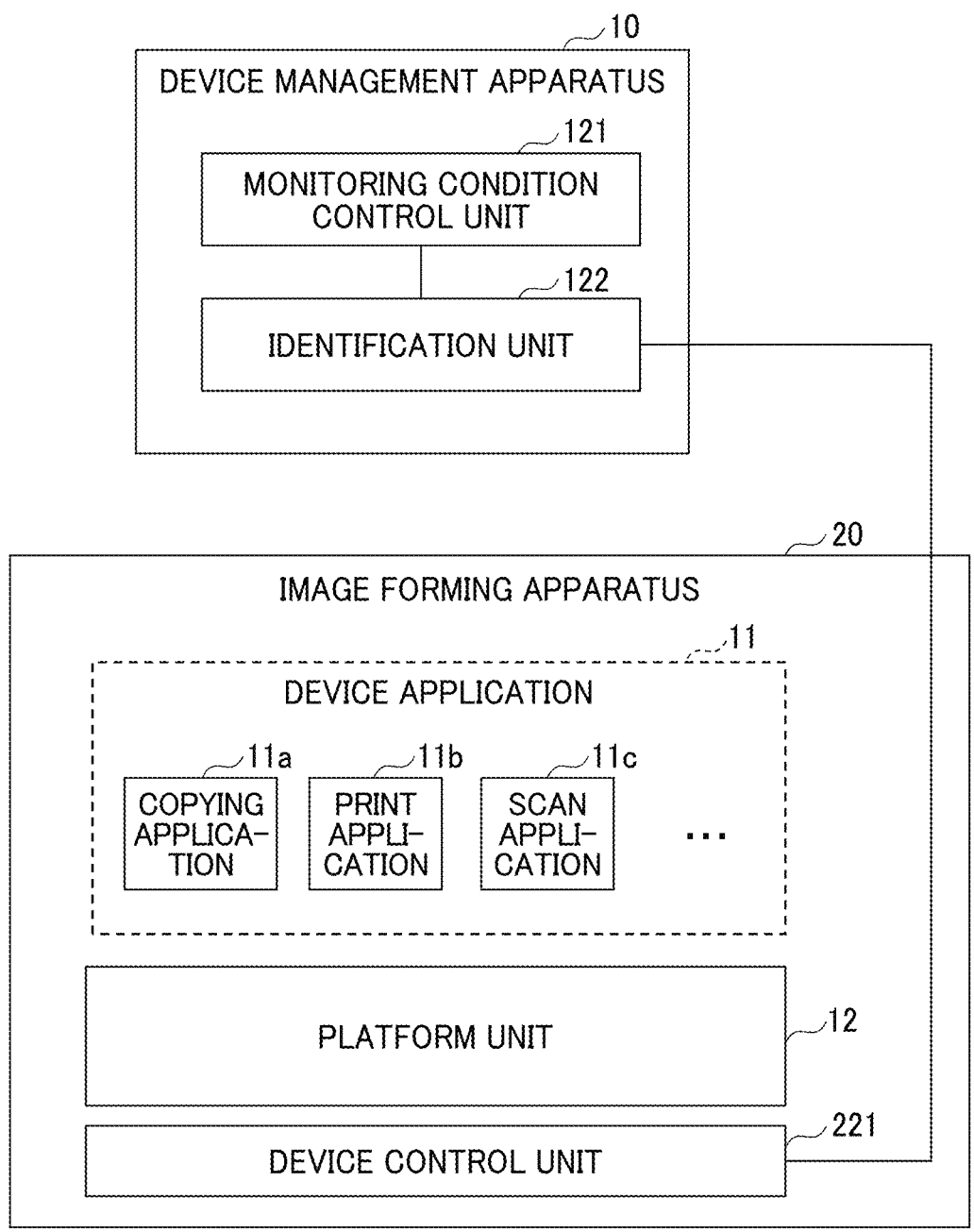
FIG. 10 is a diagram of software architecture of a device management apparatus and an image forming apparatus according to a second embodiment.

FIG. 10 is a diagram of software architecture of the device management apparatus 10 and the image forming apparatus 20 according to the second embodiment. In FIG. 10, the same reference numerals are given in the same parts as in FIG. 4, and the description thereof will be omitted. In the second embodiment, the platform unit 12 of the image forming apparatus 20 does not include the monitoring condition control unit 121, and the identification unit 122.

In FIG. 10, each of the image forming apparatuses 20 includes the device application 11, and the platform unit 12.

In this case, since the management of job is performed at the image forming apparatus 20, the usage history information is stored in the image forming apparatus 20. Therefore, in this case, the image forming apparatus 20 can be configured to transmit the usage history information to the device management apparatus 10 sequentially (e.g., each time a job is executed) or periodically.

The other processing may be similar to the processing described in FIGS. 7 to 9.

Hereinafter, a description is given of a third embodiment. In the third embodiment, portions different from those of the above described first and second embodiments will be described. Therefore, other portions not specifically descried may be the same in the above described first and second embodiments.

In each of the above described first and second embodiments, the failure risk detection condition is common to all of the image forming apparatuses 20. Therefore, the monitoring target for the failure risk detection condition is common to all of the image forming apparatuses 20. Further, some of the failure risk detection conditions set for each image forming apparatus 20 may require detailed data analysis.

However, for example, the image forming apparatus 20, which is relatively inexpensive and has relatively lower processing power, may not be equipped with processing power for performing the detailed data analysis. Therefore, when the above described first and second embodiments are to be completely performed for all of the image forming apparatus 20, the image forming apparatus 20 may be required to be a relatively expensive apparatus having a relatively higher processing power, with which the economic burden of users may be increased.

As illustrated in FIG. 11, the content of failure occurring at the image forming apparatus 20 may differ depending on sheets used by users and target images printed by users.

FIG. 11 is an example of table indicating abnormality having higher risk of occurrence depending on use style of user of the image forming apparatus 20. FIG. 11 indicates abnormality having higher risk of occurrence, and causes of abnormality with respect to sheet and printed image used by users.

Specifically, as to the sheet, if the user performs the printing using thin sheet, the risk of occurring of wrinkle on sheet is increased, and the cause of wrinkle is an increase or decrease of a fusing nip width due to deterioration of rubber layer of a fusing roller.

Further, as to the sheet, if the user performs the printing using thick sheet, the risk of occurring of misalignment of print position on the front and rear faces for the double-sided printing is increased, and the cause of misalignment is fluctuation in the sheet feed speed due to deterioration of sheet transport rollers.

Further, as to the printed image, if the user performs the printing using color printing operation many times, the risk of occurring of adhering (jamming) of sheet at the fusing process is increased, and the cause of adhering (jamming) of sheet is fluctuation in separation performance of the fusing belt and sheet due to abrasion of the fusing belt.

Further, as to the printed image, if the user performs the printing using monochrome printing operation many times and also performs the printing using color printing operation at some time, the risk of forming abnormal images during the color printing operation is increased, and the cause of forming abnormal images is mainly latent images formed on deteriorated surface of C, M, and Y drums and the deterioration of toner image quality due to the deterioration of blade member.

As above described, depending on the use style of user, the abnormality having higher risk of occurrence may differ.

Therefore, it is considered that the image forming apparatus 20 used by the user who does not use the thin sheet for printing does not need to be monitored for detecting the cause of sheet wrinkling.

Similarly, it is considered that the image forming apparatus 20 used by the user who does not use the thick sheet for printing does not need to be monitored for detecting the misalignment of print position on the front and rear faces for the double-sided printing.

Further, it is considered that the image forming apparatus 20 used by the user who uses color printing operation little does not need to be monitored for detecting the cause of jamming.

Similarly, it is considered that the image forming apparatus 20 used by the user who does not use monochrome printing operation does not need to be monitored for detecting the cause of abnormal image.

Therefore, as to the third embodiment, a description is given of setting different monitoring target for each image forming apparatus 20 in accordance with the use style of each image forming apparatus 20.

Figure 12:
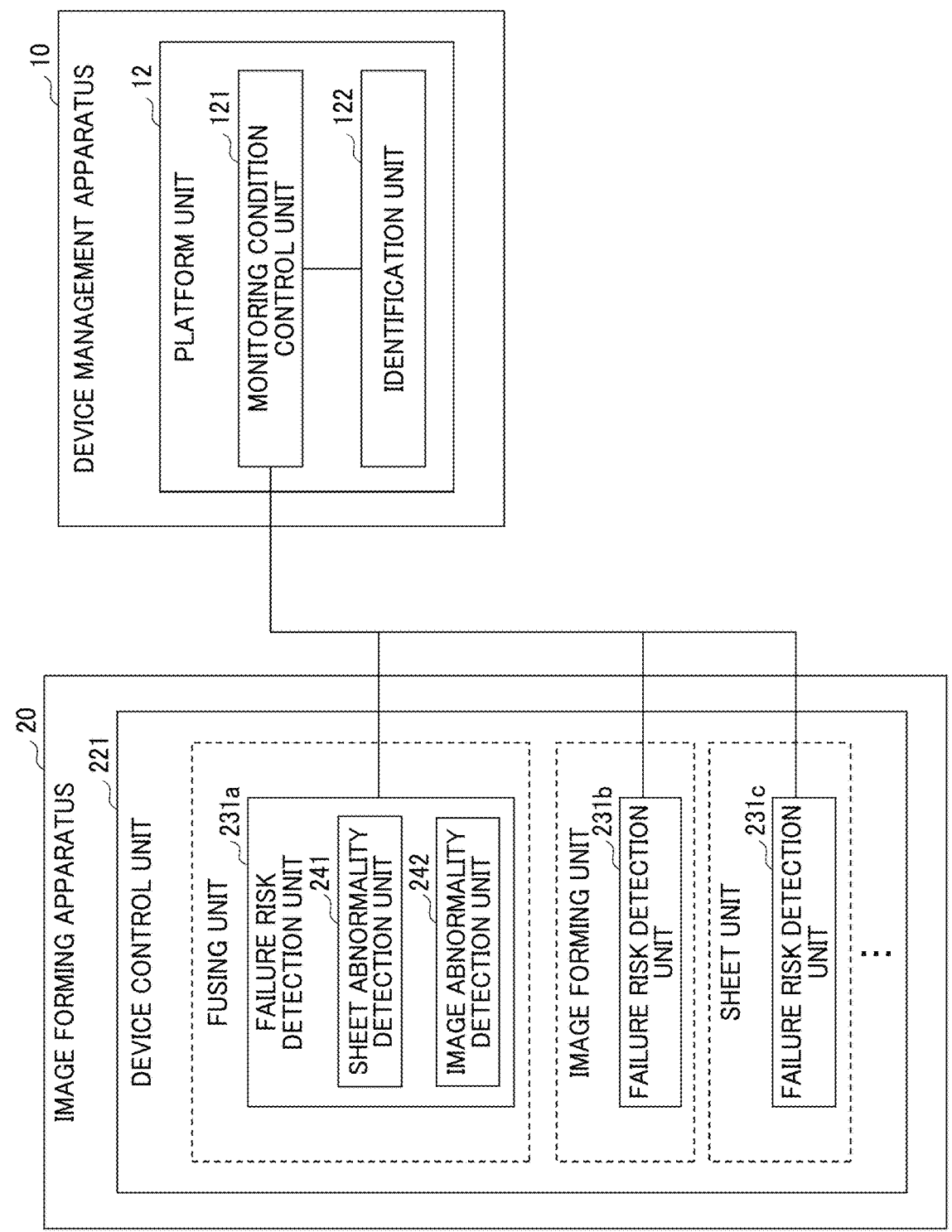
FIG. 12 is an example of configuration of functional block diagram of a device management apparatus and an image forming apparatus according to a third embodiment.

FIG. 12 is an example of configuration of functional block diagram of the device management apparatus 10 and the image forming apparatus 20 according to the third embodiment. In FIG. 12, the same reference numerals are given in the same parts as in FIG. 5, and the description thereof will be omitted.

In FIG. 12, the failure risk detection unit 231*a* includes sheet abnormality detection unit 241, and image abnormality detection unit 242. The sheet abnormality detection unit 241 monitors the failure risk of abnormality of sheet. The image abnormality detection unit 242 monitors the failure risk of abnormality of printed image.

In the third embodiment, the identification unit 122 analyzes a use ratio of various sheets at each image forming apparatus 20, a ratio of color printing operation and monochrome printing operation at each image forming apparatus 20 to identify the monitoring target for each image forming apparatus 20.

FIG. 13 is a sequence diagram illustrating an example of first processing procedure of change processing of failure detection level according to the third embodiment.

Specifically, in step S401, which is performed when a given time period T comes periodically, the identification unit 122 analyzes the use style of user of the image forming apparatus 20 (hereinafter, referred to as "use style mode") for each image forming apparatus 20 based on usage history information of each image forming apparatus 20. For example, the identification unit 122 calculates a use ratio of various sheets (e.g., thin sheet, plain sheet, thick sheet) in the given time period T, and a ratio of each of colors used for color printing operation in the given time period T.

Then, the identification unit 122 identifies or determines the monitoring target for each image forming apparatus 20 based on the analysis result of the use style mode of each image forming apparatus 20 (step S402). For example, the identification unit 122 identifies the monitoring target by referring to the classification information of monitoring target illustrated in FIG. 14.

FIG. 14 is an example of table indicating classification information of monitoring target. As indicated in FIG. 14, the classification information of monitoring target includes information indicating the monitoring target for each classification condition. The classification condition is a condition of the use style mode used for classifying the monitoring target.

In FIG. 14, as an example, it is indicated that the monitoring target is the wrinkle on sheet when a use ratio of thin sheet is equal to or greater than α% for printed sheet.

Further, it is indicated that the monitoring target is the misalignment of print position on the front and rear faces for the double-sided printing when the use ratio of thick sheet is equal to or greater than β% for printed sheet.

Further, it is indicated that the monitoring target is the adhering (jamming) of sheet at the fusing process when the use ratio of YMCK is equal to or greater than γ% for printed image.

Further, it is indicated that the monitoring target is drum image abnormality when the use ratio of K is equal to or greater than Δ% for printed image.

Further, the thresholds α, β, γ, and Δ are likely to vary depending on the failure state in the operation field of the image forming apparatus 20. Therefore, these thresholds may not be included in the classification information of monitoring target as the constant, but may be set as parameters that can be set optionally. Further, the classification information of monitoring target may be stored in, for example, the auxiliary storage device 102.

Therefore, the identification unit 122 identifies or determines the monitoring target of each image forming apparatus 20 by checking the use style mode of each image forming apparatus 20 with reference to the classification information of monitoring target. Further, a plurality of monitoring targets may be identified for the image forming apparatus 20 that corresponds to a plurality of classification conditions.

Then, the identification unit 122 notifies the monitoring target of each image forming apparatus 20, to which the monitoring target is identified, to the monitoring condition control unit 121 (step S403). Specifically, the identification unit 122 notifies the device ID of each image forming apparatus 20, to which the monitoring target is identified, and the monitoring target identified for each image forming apparatus 20, to the monitoring condition control unit 121.

Then, in step S404, in response to receiving the notification from the identification unit 122, the monitoring condition control unit 121 transmits a change request of failure detection level to each image forming apparatus 20 related to the notification. In FIG. 13, examples of the change request of failure detection level are indicated in step S404 and S405.

In step S404, for example, since the use ratio of thin sheet at the image forming apparatus 20-1 is equal to or greater than α%, a change request is set by identifying the sheet wrinkle as the monitoring target of the image forming apparatus 20-1. In this case, the monitoring condition control unit 121 transmits a change request of the failure detection level indicating that the failure detection level is 1 and the sheet wrinkle is the monitoring target to the failure risk detection unit 231a of the image forming apparatus 20-1.

Further, in step S405, for example, since the use ratio of YMCK at the image forming apparatus 20-2 is equal to or greater than γ%, a change request is set by identifying the adhering (jamming) of sheet at the fusing process as the monitoring target of the image forming apparatus 20-2. In this case, the monitoring condition control unit 121 transmits a change request of the failure detection level indicating that the failure detection level is 1 and the adhering (jamming) of sheet at the fusing process is the monitoring target to the failure risk detection unit 231a of the image forming apparatus 20-2.

Then, when each of the failure risk detection unit 231a of the image forming apparatus 20-1 and the failure risk detection unit 231a of the image forming apparatus 20-2 receives the change request of the failure detection level, the failure risk detection unit 231a monitors whether the failure risk detection condition corresponding to the monitoring target and the failure detection level designated or specified in the change request is satisfied.

For example, the sheet abnormality detection unit 241 of the failure risk detection unit 231a of the image forming apparatus 20, to which the sheet wrinkle is designated as the monitoring target, constantly monitors the time when sheets pass through the conveying sensor disposed before and after the fusing unit, and analyzes a trend of passing time of a plurality of sheets. If the passing time becomes equal to or greater than a threshold value A, the sheet abnormality detection unit 241 determines that the failure risk detection condition is satisfied.

Further, the sheet abnormality detection unit 241 of the failure risk detection unit 231a of the image forming apparatus 20, to which the misalignment of print position on the front and rear faces for the double-sided printing is designated as the monitoring target, constantly monitors the time when the sheets pass through the conveying sensor disposed before and after the secondary transfer roller, and analyzes a trend of passing time of a plurality of sheets. If the passing time becomes equal to or greater than a threshold value B, the sheet abnormality detection unit 241 determines that the failure risk detection condition is satisfied.

Further, the image abnormality detection unit 242 of the image forming apparatus 20, to which the adhering (jamming) of sheet at the fusing process is designated as the monitoring target, constantly monitors fluctuation of passing time at the fusing unit to analyze a trend of passing time of a plurality of sheets in the image forming apparatus 20. If the passing time becomes equal to or greater than a threshold value C, the image abnormality detection unit 242 determines that the failure risk detection condition is satisfied.

Further, the image abnormality detection unit 242 of the failure risk detection unit 231a of the image forming apparatus 20, to which the drum image abnormality is designated as the monitoring target, constantly monitors the fluctuation of the drum load caused by the deterioration of drum surface and the deterioration of blade. If the current amount supplied to the drum motor of YMC becomes equal to or greater than a threshold value D, the image abnormality detection unit 242 determines that the failure risk detection condition is satisfied.

Further, the threshold values A to D may differ according to the failure detection levels. For example, the thresholds A to D may be increased in response to an increase in the failure detection level.

Then, for example, when the failure risk detection unit 231a of the image forming apparatus 20-1 detects that the failure risk detection condition is satisfied (that is, the passing time becomes equal to or greater than the threshold value A), the failure risk detection unit 231a of the image forming apparatus 20-1 transmits a detection notice to the monitoring condition control unit 121 of the device management apparatus 10 (step S406). The detection notice includes the device ID of the image forming apparatus 20-1, the monitoring target related to the satisfied failure risk detection condition, and the current failure detection level (e.g., failure detection level 1).

In response to receiving the detection notice, the monitoring condition control unit 121 transmits, to the image forming apparatus 20-1, the monitoring target included in the detection notice, and a change request of failure detection level from the failure detection level 1 to the failure detection level 2, which is one level above the failure detection level 1 included in the detection notice (step S407). That is, the failure detection level is updated stepwise as in the above described first and second embodiments.

Hereinafter, a description is given of processing procedures performed when the highest level of failure risk is detected. The processing procedure is basically the same as in FIG. 8. However, as described above, the monitoring target is set for each image forming apparatus 20, and the monitoring target is included in the detection notice. When the monitoring condition control unit 121 receives the detection notice including the highest level of failure detection level, the monitoring condition control unit 121 transmits the detection notice to the maintenance system 30.

Figure 15:
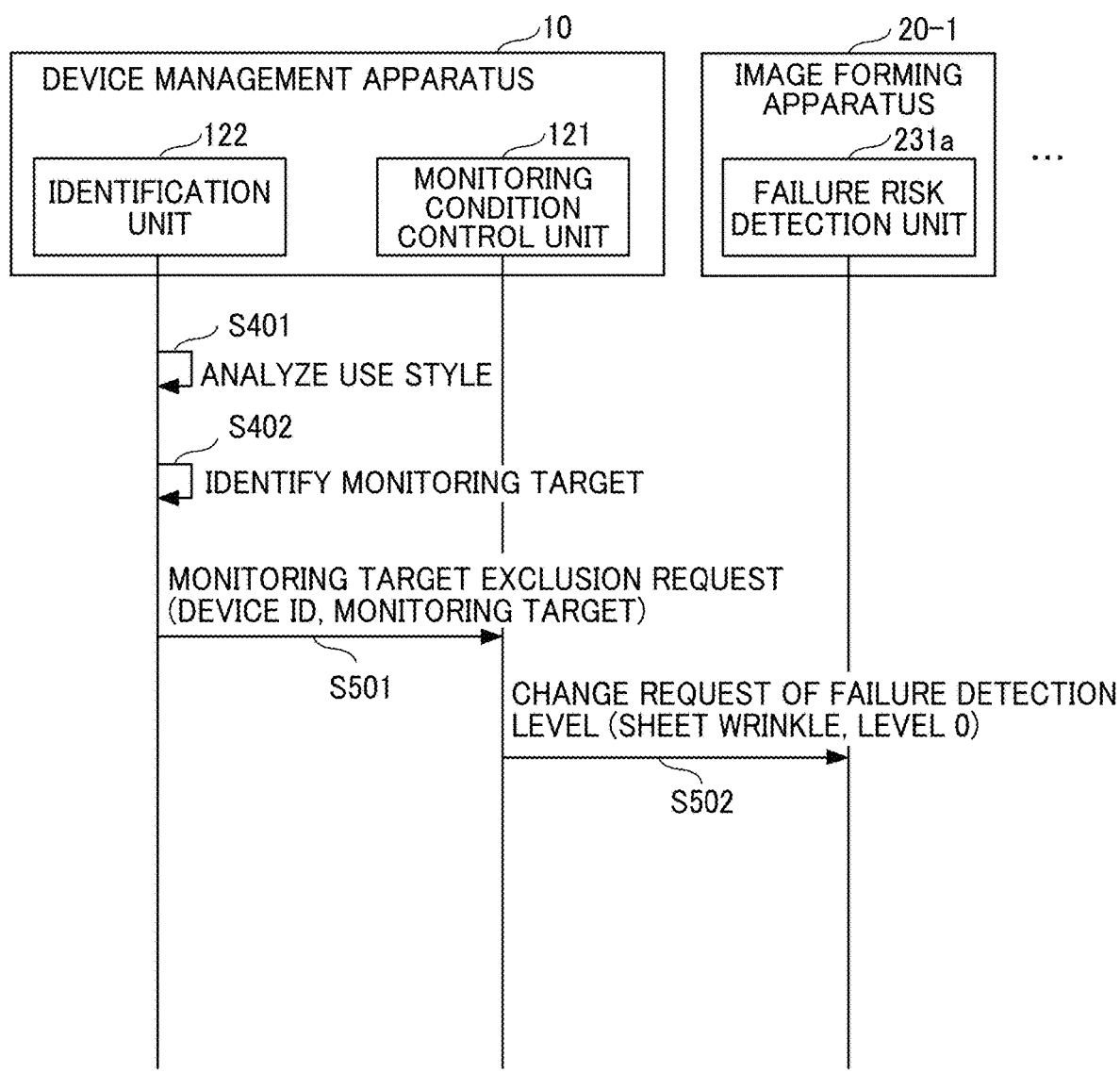
FIG. 15 is a sequence diagram illustrating an example of second processing procedure of change processing of failure detection level according to the third embodiment.

Hereinafter, a description is given of processing procedure for stopping the monitoring of the monitoring target. FIG. 15 is a sequence diagram illustrating an example of second processing procedure of change processing of failure detection level according to the third embodiment. In FIG. 15, the steps same as in FIG. 13 are denoted using the same step numbers.

If, in step S401 and step S402 that are performed periodically (when the given time period T comes), the identification unit 122 does not identify the monitoring target for any of the image forming apparatuses 20, for which the monitoring target already identified previously, step S501 and subsequent steps are performed. That is, if the image forming apparatus 20 does not satisfy the classification condition corresponding to the monitoring target, step S501 and subsequent steps are performed. FIG. 15 indicates an example case, in which the image forming apparatus 20 is the image forming apparatus 20-1 and the monitoring target is the sheet wrinkle.

In step 501, the identification unit 122 transmits a monitoring target exclusion request including the device ID of the image forming apparatus 20-1 and the monitoring target indicating the sheet wrinkle of the image forming apparatus 20-1 to the monitoring condition control unit 121.

When the monitoring condition control unit 121 receives the monitoring target exclusion request in step 501, the monitoring condition control unit 121 transmits a monitoring stop request of failure risk detection condition related to the monitoring target included in the monitoring target exclusion request to the image forming apparatus 20-1 corresponding to the device ID included in the monitoring target exclusion request.

Specifically, the monitoring condition control unit 121 transmits a change request of failure detection level indicating that the failure detection level is 0 and the monitoring target is sheet wrinkle to the failure risk detection unit 231*a* of the image forming apparatus 20-1 (step 502).

In this description, the failure detection level of "0" indicates that the monitoring of failure risk detection condition is not performed. Therefore, when the failure risk detection unit 231*a* of the image forming apparatus 20-1 receives the change request of failure detection level indicating that the failure detection level is 0, the failure risk detection unit 231*a* stops the monitoring of the failure risk detection condition related to the sheet wrinkle. As a result, the processing load of the image forming apparatus 20-1 can be reduced.

As described above, as to the third embodiment, the monitoring target can be changed for each image forming apparatus 20. In other words, each image forming apparatus 20 may be monitored by narrowing the failure risk according to the use style of each image forming apparatus 20.

Specifically, since each image forming apparatus 20 can be configured to monitor a failure risk associated with sheet (e.g., thin sheet, plain sheet, thick sheet) used at each image forming apparatus 20, and/or a failure risk associated with printed image (color, monochrome) at each image forming apparatus 20, the execution of unnecessary processing can be reduced.

Therefore, a situation that the image forming apparatus 20, which is relatively inexpensive and has relatively lower processing power, is requested to perform the monitoring that requires the image forming apparatus 20, which is relatively expensive and having a relatively higher processing power, can be reduced. As a result, the situation using the relatively expensive image forming apparatus 20 only to monitor the failure risk can be reduced, with which an increase in economic burden on users can be reduced.

Further, since the failure risk according to the use style of each image forming apparatus 20 becomes the monitoring target at each image forming apparatus 20, an improvement of detection accuracy of failure at each image forming apparatus 20 can be achieved.

Further, the analysis of use style mode (step S401) and the identification of monitoring target for each image forming apparatuses 20 (step S402) are performed periodically. Therefore, the monitoring target of each image forming apparatus 20 can be reviewed and changed in response to the change of use style of each image forming apparatus 20.

Conventional management apparatuses receive a plurality of state data from image forming apparatuses periodically even if there is no indication of failure, and thereby conventional management apparatuses receive a large amount of data periodically from many image forming apparatuses managed by the management apparatus. As a result, the processing load on the network and the processing load at the management apparatus may be increased.

The above-mentioned issue of conventional management apparatuses is not limited to image forming apparatuses, but may be common to any apparatuses being monitored via a network.

At to the above described embodiments, apparatuses or devices can be monitored efficiently using the device management apparatus.

Although the image forming apparatus 20 has been described as an example of the device in the above described embodiments, the above described embodiments can be applied to any device (e.g., projector, teleconference system, electronic whiteboard) that can be monitored via the network.

The group of apparatuses described in the embodiment only represents one example of the multiple computing environments for implementing the above described embodiments. In one embodiment, the device management apparatus 10 includes, for example, a plurality of computing devices, such as a server cluster. The plurality of computing devices are configured to communicate with each other over any type of communication link, including network or shared memory, and perform the processing disclosed in the above described embodiments. Similarly, the image forming apparatus 20 may include a plurality of computing devices configured to communicate with each other.

Further, the device management apparatus 10 and the image forming apparatus 20 may be configured to share the processing steps disclosed in the above described embodiments using various combinations.

Each function of the above-described embodiments can be implemented by one or more processing circuits. The "processing circuit" includes a processor which is programmed to perform each function by software such as a processor implemented by an electronic circuit, and device designed to perform each function described above, such as application specific integrated circuit (ASIC), digital signal processor (DSP), field programmable gate array (FPGA), conventional circuit module, or the like.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. A device management system comprising:
    a device management apparatus; and
    a plurality of devices connectable to the device management apparatus via a network,
    wherein the device management apparatus includes circuitry configured to:
    receive a notice of failure risk condition from each of the plurality of devices;
    in response to receiving a notice indicating that a first condition of the failure risk condition is satisfied from a first device among the plurality of devices, transmit to the first device a change request for changing the failure risk condition from the first condition to a second condition indicating a failure risk condition having a higher failure risk than that of the first condition to change a monitoring condition of a monitoring target of the first device;
    identify, based on similarity between information stored for the first device and information stored for each of the plurality of devices other than the first device, a second device that is to be monitored using the same monitoring condition used for the first device from the plurality of devices other than the first device; and
    transmit, to the second device, the change request for changing the failure risk condition from the first condition to the second condition.

2. The device management system according to claim 1, wherein the circuitry identifies the second device based on similarity between usage history information stored for the first device and usage history information stored for each of the plurality of devices other than the first device.

3. The device management system according to claim 1, wherein the circuitry identifies the second device based on similarity between information indicating a location where the first device is installed and information indicating a location where each of the plurality of devices other than the first device is installed.

4. The device management system according to claim 1, wherein when the circuitry determines that a notice indicating that the second condition is satisfied is not received from the first device or the second device for a pre-set time period after receiving the notice indicating that the first condition of the failure risk condition is satisfied from the first device, the circuitry transmits a change request for changing the monitoring condition from the second condition to the first condition to the first device and the second device.

5. A device management apparatus connectable to a plurality of devices via a network, the device management apparatus comprising:
    circuitry configured to
    receive a notice of failure risk condition from each of the plurality of devices;
    in response to receiving a notice indicating that a first condition of the failure risk condition is satisfied from a first device among the plurality of devices, transmit to the first device a change request for changing the failure risk condition from the first condition to a second condition indicating a failure risk condition having a higher failure risk than that of the first condition to change a monitoring condition of a monitoring target of the first device;
    identify, based on similarity between information stored for the first device and information stored for each of the plurality of devices other than the first device, a second device that is to be monitored using the same monitoring condition used for the first device from the plurality of devices other than the first device; and
    transmit, to the second device, the change request for changing the failure risk condition from the first condition to the second condition.

6. A device connectable to a device management apparatus via a network, the device comprising:
    circuitry configured to
    transmit a notice indicating that a first condition of failure risk condition, set as a monitoring condition of a monitoring target, is satisfied to the device management apparatus;
    receive, from the device management apparatus, a change request for changing the failure risk condition from the first condition to a second condition indicating a failure risk condition having a higher failure risk than that of the first condition to change the monitoring condition of the monitoring target of the device; and
    start to monitor the monitoring target of the device using the second condition.

* * * * *